US010102176B2

(12) United States Patent
Zheng et al.

(10) Patent No.: US 10,102,176 B2
(45) Date of Patent: Oct. 16, 2018

(54) METHODS AND APPARATUS FOR RAPID SWITCHING OF HARDWARE CONFIGURATIONS WITH A SPEED LIMITED BUS

(71) Applicant: Apple Inc., Cupertino, CA (US)

(72) Inventors: Dong Zheng, Los Altos, CA (US); Joseph William Colosimo, Cupertino, CA (US); Venkata Siva Sunil Kumar Reddy Bommu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 290 days.

(21) Appl. No.: 14/616,550

(22) Filed: Feb. 6, 2015

(65) Prior Publication Data

US 2016/0232124 A1 Aug. 11, 2016

(51) Int. Cl.
*H05K 7/10* (2006.01)
*G06F 3/00* (2006.01)
*G06F 13/42* (2006.01)
*G06F 13/40* (2006.01)

(52) U.S. Cl.
CPC ...... *G06F 13/4282* (2013.01); *G06F 13/4031* (2013.01); *G06F 13/4054* (2013.01)

(58) Field of Classification Search
CPC ..... H04L 69/18; H04L 41/0803; H04L 69/14; H04L 69/04; H04L 69/08; H04L 1/1812; G06F 3/0484
USPC ................................... 710/11, 104–106, 301
See application file for complete search history.

(56) References Cited

U.S. PATENT DOCUMENTS

| 5,083,310 | A | * | 1/1992 | Drory | G11B 20/00007 375/245 |
| 5,420,412 | A | * | 5/1995 | Kowalski | G06K 7/0008 235/492 |
| 5,903,754 | A | * | 5/1999 | Pearson | H04L 29/06 709/230 |
| 6,098,138 | A | * | 8/2000 | Martinelli | G06F 13/387 709/227 |
| 6,891,857 | B1 | * | 5/2005 | Nevo | H04L 12/66 370/201 |
| 6,898,640 | B1 | * | 5/2005 | Kurita | H04L 29/06 709/222 |
| 6,952,751 | B1 | * | 10/2005 | Gulick | G06F 13/4208 710/106 |
| 8,498,278 | B2 | * | 7/2013 | Beach | H04L 12/4625 370/328 |

(Continued)

*Primary Examiner* — Faisal M Zaman
(74) *Attorney, Agent, or Firm* — Gazdzinski & Associates, PC

(57) ABSTRACT

Methods and apparatus for enabling rapid transactions over a speed limited bus are disclosed. In one exemplary embodiment of the present disclosure, a host controller and an application specific integrated circuit (ASIC) are connected via an Inter-Integrated Circuit (I2C) Bus that is further adapted to enable a simplified signaling scheme. Unlike traditional I2C bus transactions which are flexible but speed limited, the simplified signaling scheme reduces bus overhead and enables rapid transactions. In an exemplary context, the simplified signaling scheme enables the ASIC to rapidly configure a series of photodiodes with different channel gain parameters so as to, for example, measure heartbeats by visually detecting a pulse within human flesh.

20 Claims, 6 Drawing Sheets

(56) References Cited

U.S. PATENT DOCUMENTS

| | | | | |
|---|---|---|---|---|
| 2002/0181497 | A1* | 12/2002 | Mano | H04L 12/2832 370/466 |
| 2003/0235204 | A1* | 12/2003 | Azevedo | G06F 13/4243 370/466 |
| 2006/0235981 | A1* | 10/2006 | Westman | H04L 12/185 709/227 |
| 2010/0082859 | A1* | 4/2010 | Hendry | G06F 13/4291 710/60 |
| 2010/0191870 | A1* | 7/2010 | Qi | G06K 7/10297 710/11 |
| 2012/0017074 | A1* | 1/2012 | Kelly | G06F 9/4411 713/100 |
| 2014/0014839 | A1* | 1/2014 | Chang | G06F 3/017 250/338.4 |
| 2014/0121471 | A1* | 5/2014 | Walker | A61B 5/1128 600/301 |
| 2015/0043410 | A1* | 2/2015 | Chaturvedi | H04W 52/0206 370/311 |

* cited by examiner

METHODS AND APPARATUS FOR RAPID SWITCHING OF HARDWARE CONFIGURATIONS WITH A SPEED LIMITED BUS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The disclosure relates generally to the field of hardware configuration within the context of an interconnect bus. In one exemplary aspect, the disclosure is directed to methods and apparatus for switching between dedicated hardware configurations for a device on an Inter-Integrated Circuit (I2C) Bus. More generally, various aspects of the present disclosure are directed to enabling rapid transactions over a speed limited bus.

2. Description of Related Technology

The Inter-Integrated Circuit (I2C) bus technology is a multi-master, multi-slave, single-ended serial bus technology which is commonly used in consumer electronics devices. The I2C bus uses two bi-directional open-drain lines to transact serial data (SDA), and serial clock (SCL). Traditionally, the I2C bus is most commonly used within consumer applications as an interconnect bus technology for different integrated circuits (ICs) which may each independently arbitrate for control of the bus and thereafter transact data.

As a brief aside, extant I2C operation is based on a master-slave (master-peripheral) protocol; a node arbitrates to become master of the bus, and thereafter can write to any of the other nodes. Once the master node relinquishes control of the I2C bus, another node can arbitrate to become a master. In this manner, any node can master the bus, and any node can be addressed as a slave. It is worth noting that the I2C bus uses open-drain drivers. Open-drain technology allows any node to assert a logic low (by driving the signal to GND), but the bus must float in order to signal a logic high (e.g., via pull up resistors to Vdd). Since open-drain nodes can only drive GND, the bus does not experience drive conflicts (where one node drives logic low and another node drives a logic high).

While the I2C bus has wide-spread adoption within embedded circuit solutions and provides significant benefits, those of ordinary skill in the related arts will readily appreciate that the arbitration process in combination with the open-drain technology of the I2C bus is relatively slow. Moreover, certain types of applications may have repetitive (or relatively "fixed") tasks which are periodically executed. In these instances, the flexibility of I2C technology is less important, and the overall transaction speed is a significant limitation.

Accordingly, improved methods and apparatus are needed for providing rapid transaction capabilities via the I2C bus. More generally, solutions are needed for enabling rapid transactions over a speed limited bus.

SUMMARY

The present disclosure satisfies the foregoing needs by providing, inter cilia, methods and apparatus for enabling rapid transactions over a speed limited bus.

In one aspect, a method for enabling rapid transactions over a speed limited bus is disclosed. In one embodiment the method includes: pre-loading a series of parameters into a component; enabling a simplified signaling protocol; causing the component to perform one or more operations with the series of parameters, based on the simplified signaling protocol; and upon completion of the one or more operations, disabling the simplified signaling protocol.

In one variant, the pre-loading is performed according to a first protocol; and the first protocol enables at least one capability that the simplified signaling protocol does not enable. For example, in some variants, the at least one capability is selected from the group consisting of: addressing, flow control, bus arbitration, acknowledgment/non-acknowledgement, and power control. In some variants, the first and simplified signaling protocols are mutually exclusive. Alternatively, the first and simplified signaling protocols coexist.

In some variants, the one or more operations include a mutually-agreed-upon context characterized by a specific purpose. In some such variants, the specific purpose includes performing a series of measurements based on the series of parameters. For example, the one or more operations may include incrementing through each measurement of the series of measurements. In another example, the one or more operations includes resetting the series of measurements.

In another aspect, an apparatus configured to enable rapid transactions over a speed limited bus is disclosed. In one embodiment, the apparatus includes: one or more photodiodes and one or more light emitting diodes (LEDs); a controller coupled to an operational memory; an applications specific integrated circuit (ASIC) coupled to a parameter memory; where the controller and the ASIC are connected via a speed limited bus; and where the operational memory includes a non-transitory computer readable medium including instructions. In one exemplary embodiment, the instructions are configured to cause the controller to: pre-load a series of parameters into the parameter memory; enable a hardware gain switching mode; signal one or more operations with the series of parameters, based on the hardware gain switching mode; and where at least one of the one or more operations is configured to cause the ASIC to set a gain for at least one of the one or more photodiodes.

In one variant, the speed limited bus includes an Inter-Integrated Circuit (I2C) Bus including a serial data (SDA) and serial clock (SCL). In one such implementation, a first signal associated with the at least one of the one or more operations includes toggling the SDA while holding the SCL at a logic high. In this example, the first signal is not a valid I2C transaction.

In another variant, the hardware gain switching mode is configured to prevent another component from mastering the I2C bus.

In another aspect, an apparatus configured to enable rapid transactions over a speed limited bus is disclosed. In one embodiment, the apparatus includes: a non-transitory computer readable medium including instructions which when executed by a controller are configured to cause the controller to: operate the speed limited bus according to a first protocol; operate the speed limited bus according to a second protocol; and where the second protocol is configured to perform a limited set of operations based on a pre-loaded series of parameters.

In one variant, the apparatus further includes a second non-transitory computer readable medium configured to store the pre-loaded series of parameters.

In another variant, the pre-loaded series of parameters are loaded during manufacture.

In still other variants, the speed limited bus includes an Inter-Integrated Circuit (I2C) Bus including a serial data (SDA) and serial clock (SCL). In one such case, the second protocol includes at least one signal which is an invalid I2C transaction. In another such case, the second protocol includes at least one signal which is a null I2C transaction.

Other features and advantages of the present disclosure will immediately be recognized by persons of ordinary skill in the art with reference to the attached drawings and detailed description of exemplary embodiments as given below.

Figure 1:
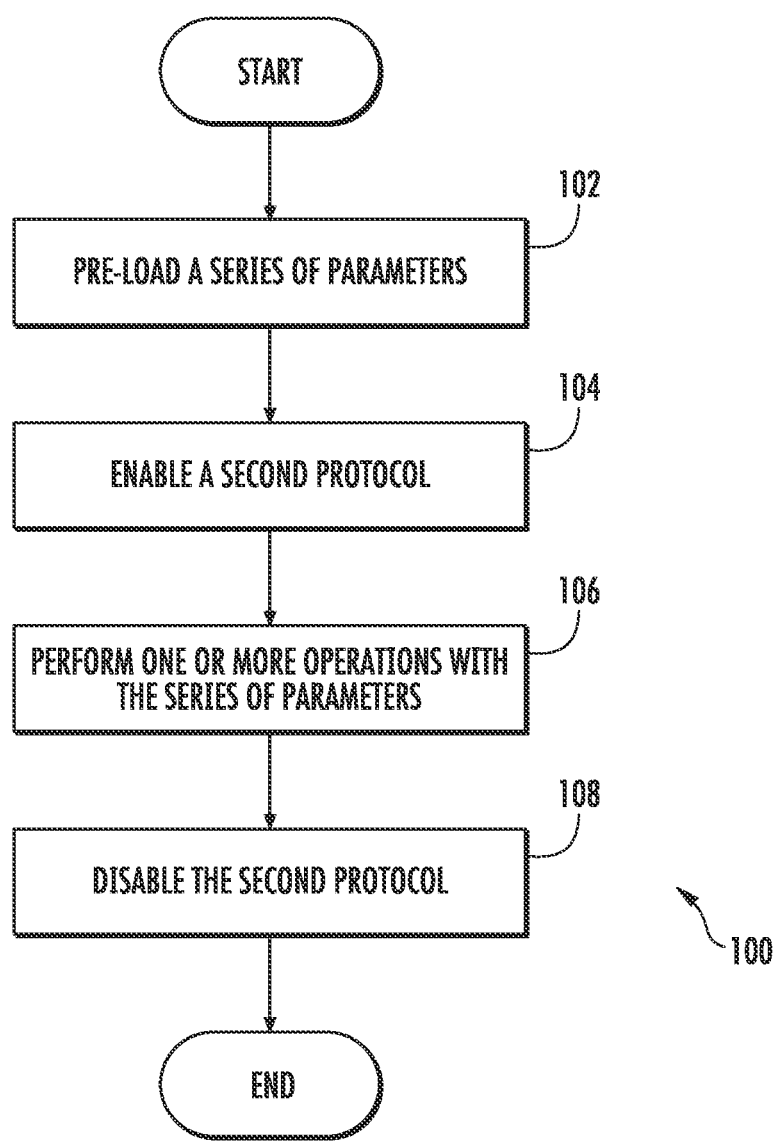
FIG. 1 is a logical flow diagram of one generalized method for enabling rapid transactions over a speed limited bus, in accordance with various aspects of the present disclosure.

All Figures © Copyright 2014 -2015 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of a speed limited serial bus technology, it will be recognized by those of ordinary skill that the present disclosure is not so limited. In fact, the various aspects of the disclosure are useful in any series of bus transactions which can be predictably configured in advance.

While the following embodiments describe specific implementations of e.g., switching between various hardware gain parameters of a network of photodiodes, those of ordinary skill in the related arts will readily appreciate that such descriptions are purely illustrative.

Existing I2C Bus Operation—

As previously noted, the Inter-Integrated Circuit (I2C) bus technology is a multi-master, multi-slave, single-ended serial bus technology which is commonly used in consumer electronics devices. The I2C bus is based on a two-wire interface that includes two bi-directional open-drain lines to transact serial data (SDA), and serial clock (SCL). The existing I2C messaging protocol is limited to byte-wise writes/reads and/or sequential writes/reads (multiple bytes).

In order to perform a byte write operation, the I2C master transmits a byte write command, a device address, and a register address (within the I2C slave device). Upon receiving a byte write operation, the I2C slave identified by the device address responds with an acknowledgement (typically by asserting a logic low) and then the I2C master transmits the byte of data which is clocked into the I2C slave (i.e., each bit of the byte is separately clocked by SCL). Upon receiving the data, the I2C slave acknowledges reception and the I2C master terminates the write sequence with a stop condition (by releasing the SDA line (to float high), when SCL is high). Thereafter, the I2C slave can safely update its internal registers with the written value. In a sequential write, rather than terminating the write sequence with a stop condition, the I2C master continues transmitting more data bytes which are written to sequentially incremented addresses (e.g., 0, 1, 2, etc.). The I2C slave will acknowledge each byte received. When the sequential write is complete, the microcontroller terminates the write sequence with a stop condition.

In order to perform a byte read operation, the I2C master transmits a byte read command which includes a "dummy" byte write sequence to load the register address to be read. Once the device address and register address are clocked in and acknowledged by the I2C slave, the I2C master transmits a start condition (by pulling the SDA low, when SCL is high). Thereafter, the I2C master can read an address by sending a device address with the read/write select bit set to a read (e.g., logic high). The I2C slave acknowledges the device address and serially clocks out the data byte. As before, for a single byte read, the I2C master generates a stop condition after receiving the byte of data, whereas for a sequential read the I2C master acknowledges each byte of data (of a multiple byte stream) until completion.

While I2C technology is commonly used for component interfaces due to its simplicity, the I2C interface is very slow. As previously alluded to, the open-drain structure of I2C significantly limits bus speeds. For example, typical implementations of I2C operate at transfer speeds of 100 kbits/second. More recent versions of I2C operate at 400 kbits/second (so-called "Fast Mode"), or up to 3.4 Mbits/second (so-called "High Speed Mode"). However, higher speed operation is more complex and requires specialized hardware and layout constraints which may not always be supported by commodity component manufacturers.

Certain types of applications are poorly served by existing I2C technology. For instance, some applications (such as hardware configuration) may repetitively perform the same types of tasks, and/or may execute a predictable series of tasks. Consider one such case where dedicated hardware is used to perform a series of measurements and gain adjustments at regular intervals. Within the context of an I2C bus, each gain adjustment and/or measurement must be slowly read into and out of the dedicated hardware. In such cases, the I2C bus transaction speed severely limits operation. Accordingly, what is needed is a scheme for efficiently switching between dedicated hardware configurations for a device on an I2C Bus. More generally, various aspects of the present disclosure are directed to enabling rapid transactions over a speed limited bus.

Methods—

Referring now to FIG. 1, one generalized method 100 for enabling rapid transactions over a speed limited bus is disclosed. In one exemplary context, an I2C master (e.g., a controller) pre-loads a series of channel gain parameters to a specialized application specific integrated circuit (ASIC) which controls an array of photodiodes and LEDs arranged as a personal heartbeat monitor device. The channel gain parameters are used to adjust the sensitivity of the photodiodes.

At step 102 of the method 100, a series of parameters are pre-loaded into a component. As used herein, the term "parameter" may refer to any factor(s) or element(s) (which may be embodied as e.g., a message, instruction, etc.) which defines an operation or sets the conditions of an operation. As used herein, an operation may refer to any sequence of logical, electrical, and/or mechanical steps or manipulations configured to elicit a desired outcome. Common examples of parameters may include e.g., gain, amplitude, frequency, phase, modes, time, degree, resistance, capacitance, inductance, quantity, quality, etc.

In one embodiment, the series of parameters are pre-loaded within a static configuration during e.g., manufacture, firmware update, etc. In other embodiments, the series of parameters are pre-loaded at any time up until the point of execution. For example, the series of parameters may be periodically updated by higher level software (e.g., a software application, or operating system (OS)). Moreover, in some cases the parameters are provided to the component, whereas in other implementations the component may internally derive or "learn" parameters independently. For example in some variants, the series of parameters may be updated (independent of external software) based on internal algorithms, historic analysis, etc. For example, historically certain parameters may yield better results (e.g., better reception, more robust operation, etc.), over time these parameters may be emphasized to improve performance (e.g., by selecting new parameters which optimize performance, etc.)

In one embodiment, the series of parameters are ordered in sequence. In other embodiments, the series of parameters are ordered according to priority. In still other embodiments, the series of parameters are not ordered per se, but organized according to an addressable range so as to facilitate recall according to a simplified signaling scheme. Those of ordinary skill in the related arts will readily appreciate that up to $2^N$ different parameters may be addressed according to N bits. For instance, eight (8) different gain parameters may be addressed with a three (3) bit instruction. Other common schemes for organizing the parameters may include, without limitation e.g., one-hot encoding, balanced and unbalanced binary trees, ring arrays, linked lists, etc. Moreover, still other schemes for organization may be based on qualified states or characteristics (e.g., for example, one set of parameters may be enumerated as the states "HIGH GAIN", "LOW GAIN", "SLEEP", etc.)

In some embodiments, the series of parameters correspond to one or more operations of the component itself. Common examples of components include without limitation e.g., microprocessors, memory, sensors, transceivers, amplifiers, transducers, interconnects, power supplies, switches, etc. Furthermore, common examples of parameters may include without limitation e.g., any value, set of values, configuration, mode selection, instruction, array, vectors, messages, etc. the foregoing being purely illustrative. In alternative implementations, the series of parameters correspond to one or more substituent components within the component's control. For example, a processor/microcontroller may be able to configure, enable/disable, various substituent components according to one or more parameters. In some cases, the processor/microcontroller may interpret parameters in conjunction with other considerations so as to effectuate the operation.

In some embodiments, the bus has multiple modes of operation. Common examples of operation include without limitation: normal operation, accelerated operation, legacy operation, proprietary operation and/or limited capability operation, idle operation, sleep operation, low-power operation, etc.

In some cases, bus operation may have characteristic physical features such as e.g., number and/or type of signaling. For example, in some cases, the bus may be characterized as: single wire, two-wire, or higher order configurations (e.g., 4-wire, 8-wire, etc.). In some cases, the bus may be characterized as single-ended or differential signaling. In still other cases, the bus may be based on digital (e.g., rising edge, falling edge) or analog (e.g., level based) signaling. In still other embodiments, bus operation may have characteristic logical features such as e.g., channels, timeslots, virtualization, tunneling, etc.

In some cases, the bus may implement signal conditioning, or other fowls of signal formatting which are unrelated to, and/or distinct from, transacted data. For example, certain bus technologies employ line coding (e.g., 8B10B encoding, parity, scrambling, etc.).

While the present disclosure is generally described with reference to Inter-Integrated Circuit (I2C) bus technology, it is readily appreciated that the various principles described herein may be used with equal success in a wide variety of bus technologies. More generally, various aspects of the present disclosure are directed to enabling a master and slave device to utilize (or re-use) the hardware underlying the existing communication system in a mutually-agreed-upon context, which does not interfere or harm the operation of the existing communication system. In some exemplary embodiments, the mutually-agreed-upon context has a specific purpose (e.g., is limited to a specific function, etc.) or use case. Those of ordinary skill in the related arts will recognize that the aforementioned features of the present disclosure may find application in a range of other common bus technologies that include without limitation any wired or wireless interface: Integrated Interchip Sound (I2S), Serial Port Interface (SPI), Universal Serial Bus™ (USB), IEEE 1394 (e.g., FireWire™), High Definition Multimedia Interface™ (HDMI), Digital Visual Interface™ (DVI), DisplayPort™, Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), Wi-Fi (e.g., 802.11a,b,g,n, or any draft standards relating thereto), WiMAX (802.16), PAN (802.15), IrDA and/or other wireless families, including Bluetooth.

In the exemplary context of the present disclosure, the component is configured to communicate according to at least a first protocol (and a second protocol described hereinafter). For example, in one such implementation described in greater detail hereinafter (see e.g., Example Operation), the component is configured to communicate according to a first Inter-Integrated Circuit Bus (I2C) protocol, and a second Hardware Gain Switching Mode (HGSM) protocol. More generally, the first communication protocol enables data transfer suitable for typical bus operation. Common features which are typically present within computing buses include without limitation: addressing, flow control (e.g., bulk data transfers, stop-and-wait, polling, etc.), bus arbitration, acknowledgment/non-acknowledgement, power control (sleep states, idle states, etc.), direct memory access (DMA), etc.

Those of ordinary skill in the related arts will readily appreciate that the flexibility and capabilities of the first protocol impact bus performance. For example, in the context of a serial bus (which can provide bits serially in time), each bit of address and data take a bus clock cycle. Similarly, in the context of multi-master/multi-slave bus technologies, bus arbitration and bus contention take time to resolve. More generally, complexity and/or flexibility of bus technologies typically require some bus overhead (e.g., time and/or bus resources).

At step 104 of the method 100, a second protocol is enabled and/or the other nodes of the network are configured for simplified signaling. Unlike the first protocol which has certain limitations due to overhead, the second protocol specifically enables a simplified signaling scheme which reduces one or more aspects of bus overhead. Examples of the reducing overhead include one or more of the following, without limitation: eliminating or reducing addressing, eliminating or reducing data capabilities, eliminating or reducing control indications (e.g., read/write signaling, stop/start signaling, etc.), eliminating or reducing arbitration, etc. For reasons which will become readily obvious hereinafter, the elimination or reduction of overhead does not affect operation for fixed or well-defined operations such as processing a series of pre-loaded parameters.

In one embodiment, the first protocol and second protocol of bus operation coexist during operation. More directly, the component continues to respond to bus commands issued under the first protocol, while operating in accordance with the second protocol. For example, in one exemplary embodiment, a component continues to respond to typical I2C bus commands when operating in Hardware Gain Switching Mode (HGSM). In alternative embodiments, the first protocol and second protocol of bus operation are mutually exclusive. In still other embodiments the component suspends (or otherwise disables) operations under a portion of the first protocol, while operating in accordance with the second protocol and the remaining subset of the first protocol.

In one exemplary embodiment, enabling the second protocol is based on a specified instruction or operation issued under the first protocol. In one exemplary embodiment, a HGSM protocol is enabled via an I2C register write or other logical trigger event. For example, in one exemplary embodiment, the HGSM protocol is triggered by writing to a control bit (HW_GAIN_MODE_EN), and allowing SCL to transition to logic high first, followed by allowing SDA to transition to logic high. More generally, those of ordinary skill in the related arts will readily appreciate that the second protocol may be enabled based on e.g., transactions occurring in an out-of-band interface (e.g., higher layer software, etc.). Still other implementations may enable the second protocol based on e.g., General Purpose IOs, interrupts, dedicated logic, etc.

In some embodiments, the component is granted control of the bus. In other embodiments the component must master the bus via arbitration procedures. In still other variants, the component need not master the bus to implement the simplified signaling (e.g., the simplified signaling does not conflict with normal bus operation).

In some implementations, there may be some erratic signaling as various other nodes of the network configure themselves for the second protocol; accordingly, the component may delay operations on the second protocol so as to prevent bus confusion. In some cases, the delay is a fixed time. In other cases, the delay may be based on bus signaling (e.g., both SDA and SCL floating to logic high, etc.) In various other embodiments, the component may reset the bus before operation (e.g., unknown bus states are reset to a known state).

At step 106 of the method 100, one or more operations with the series of parameters are performed based on simplified signaling specified within a second protocol. As previously alluded to, the simplified signaling eliminates or reduces unnecessary bus overhead by limiting the signaling to a few fixed or well-defined operations.

In one exemplary embodiment, the simplified signaling includes two (2) instructions: (1) increment one or more pointers, and (2) reset the one or more pointers. In one such implementation, incrementing the one or more pointers is signaled by an edge on the SDA line of an I2C bus while the SCL line is held high, and resetting the one or more pointers is signaled by an edge on the SCL line while the SDA line is held high. Still other combinations are readily appreciated by those of ordinary skill in the art; for instance, the SDA and SCL may additionally indicate other operations based on an edge (e.g., of SDA) occurring while the other signal (e.g., SCL) is held low, etc.

Various other embodiments may transition through the series of parameters according to any number of possible schemes. For example, transitions may be based on incrementing a pointer, decrementing a pointer, skipping (e.g., every other, every third, etc.), address-based, subject to a specified sequence (e.g., pseudo-noise sequence), etc.

For embodiments where multiple different parameters are transitioning at once (e.g., a first gain for channel 0 and a second gain for channel 1, etc.), the transitions may occur concurrently, or individually. In some cases, the parameters may be independently signaled (e.g., channel 0 gain parameters may be transitioned according to SDA, channel 1 gain parameters may be transitioned according to SCL). In alternate implementations, the simplified signaling is multiplexed (e.g., channel 0 gain parameters may be transitioned according to every other SDA rising edge, channel 1 gain parameters may be transitioned according to the non-channel 0 transitions; channel 0 gain parameters may be transitioned according to SDA transitions when SCL is logic low, and channel 1 gain parameters may be transitioned when SDA rising edges occur during a SCL logic high, etc.). While the foregoing examples are presented within the context of a combination of edges and levels, it should be appreciated that any number and/or combination of edges and levels may be used. For example, SDA and/or SCL can be toggled any number of times and may be determined with reference to a logic level, rising or falling edge, etc.

At step 108 of the method 100, the second protocol is disabled. In one embodiment, the first protocol continues normal operation; alternatively, the first protocol may be re-enabled once the second protocol is disabled.

In some embodiments, disabling the second protocol is based on a specified instruction or operation issued under the first protocol. For example, in one exemplary embodiment, the HGSM protocol is disabled by clearing a control bit (HW_GAIN_MODE_EN), and allowing SCL to transition to logic high first, followed by allowing SDA to transition to logic high. More generally, those of ordinary skill in the related arts will readily appreciate that the second protocol may be disabled based on e.g., transactions occurring in an out-of-band interface (e.g., higher layer software, etc.). Still other implementations may disable the second protocol based on e.g., General Purpose IOs, interrupts, dedicated logic, etc.

In some embodiments, the second protocol may incorporate commands (or another trigger condition) to re-enable the first protocol. In some variants, only one of the two (or more) protocols may communicate to a given device at a time; in such variants, the protocols each provide an instruction, trigger condition, or other means to switch between the two (or more) protocols. In other variants, the first protocol is always active while the second protocol can be enabled or disabled (for performance, power reasons, glitch rejection, etc.)

Various other implementations may automatically disable the second protocol according to a set condition. For example, in some cases, the second protocol may be automatically disabled when all the parameters have been consumed (e.g., as opposed to looping back). Other examples of termination conditions include without limitation: timer expiration, a number of iterations, an out-of-band condition (e.g., application layer software conditions), power conditions (e.g., sleep mode), etc.

Apparatus—

Figure 2:
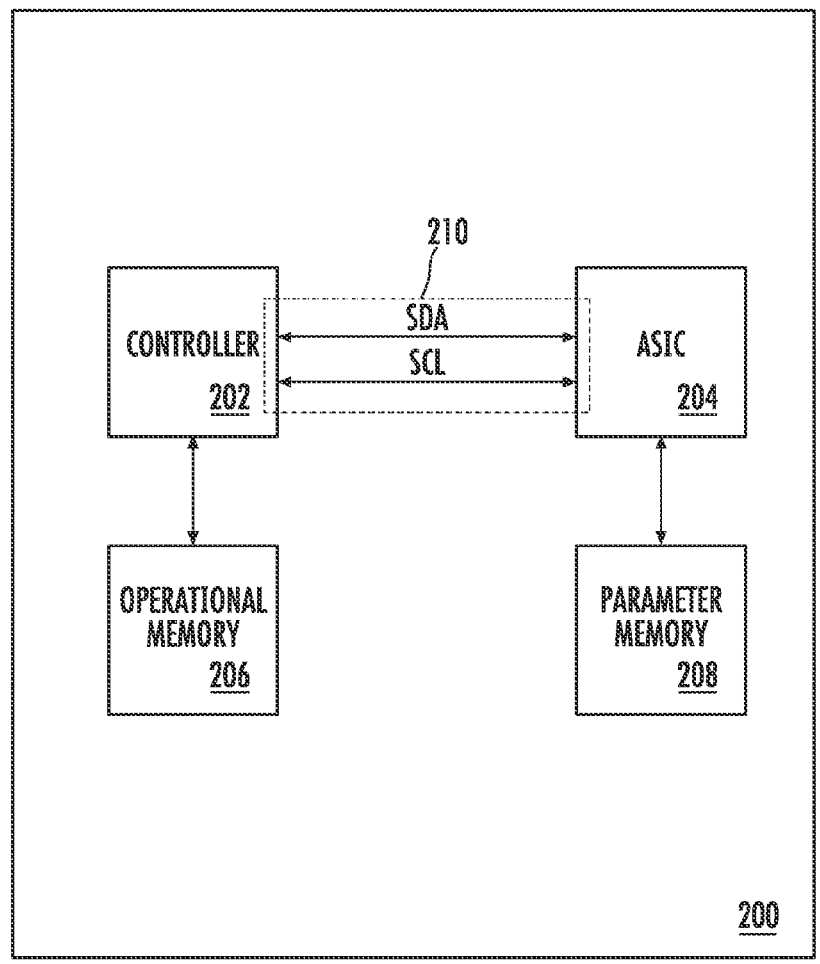
FIG. 2 is a logical block diagram of one generalized apparatus configured to enable rapid transactions over a speed limited bus, in accordance with various aspects of the present disclosure.

Referring now to FIG. 2, one generalized apparatus 200 configured to enable rapid transactions over a speed limited bus is disclosed. While a specific device configuration and layout is shown and discussed, it is recognized that many other implementations may be readily implemented by one of ordinary skill given the present disclosure, the apparatus 200 of FIG. 2 being merely illustrative of the broader principles of the invention.

The illustrated apparatus 200 of FIG. 2 includes a controller 202, an application specific integrated circuit (ASIC) 204, and a communication bus 210. In one exemplary embodiment, the controller 202 and ASIC 204 include one or more of central processing units (CPU) or digital processors, such as a microprocessor, digital signal processor, field-programmable gate array, reduced instruction set core (RISC), or plurality of processing components mounted on one or more substrates. While the illustrated embodiment consists of two nodes, those of ordinary skill in the related arts will readily appreciate that the various aspects of the present disclosure may be implemented on networks of components, in virtually any configuration (e.g., ring, star, tree, mesh, etc.)

The controller 202 is coupled to operational memory 206 and the ASIC 204 is coupled to the parameter memory 208. As used herein, the term "memory" refers to any non-transitory computer-readable media configured to store digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. Those of ordinary skill in the related arts will readily appreciate that the distinction between operational memory 206 and parameter memory 208 is purely illustrative; it is readily contemplated that the operational memory 206 and parameter memory 208 may be physically or virtually consolidated within a single memory component or alternatively distributed among many memory components.

In one exemplary embodiment, the controller 202 and ASIC 204 include an Inter-Integrated Circuit (I2C) bus interface 210. In some embodiments the controller 202 and ASIC 204 are capable of both I2C master and slave capabilities; in other embodiments, the controller 202 and/or ASIC 204 may be limited in functionality to either I2C master or slave capabilities. The I2C bus is illustrated as a two-wire interface including serial data (SDA) and serial clock (SCL) lines. The SDA and SCL lines are single-ended and configured for bidirectional operation based on an open-drain configuration.

In one embodiment of the present disclosure, the I2C bus interface 210 is configured to communicate according to at least the I2C protocol and a second protocol that allows for rapid switching of parameters. For example, in one such implementation described in greater detail hereinafter (see e.g., Example Operation), the second protocol is a Hardware Gain Switching Mode (HGSM).

In one exemplary embodiment, the operational memory 206 includes instructions which when executed by the controller 202, causes the controller to pre-load a series of parameters into the parameter memory 208. In some cases, the apparatus may receive the series of parameters from e.g., higher level software (e.g., a software application, or operating system (OS)), external devices (e.g., servers, cloud networks, etc.), user preferences/selection/configuration, etc. In certain variants, the apparatus may be configured to derive the parameters based on e.g., application requirements, historical use analysis, user demographics, etc. In alternative embodiments, the series of parameters are pre-loaded into the parameter memory 208 during e.g., manufacture (e.g., "burned" in), firmware update, etc.

In one embodiment, the parameter memory 208 includes a memory configured to store one or more series of parameters. Each one of the one or more series of parameters may be ordered or otherwise organized for efficient recall. Common schemes for ordering may be based on e.g., a sequential order, ascending priority, descending priority, etc. Common schemes for organization may be based on e.g., addressing schemes, hashing schemes, most recent use (MRU), least recent use (LRU), enumerated qualities (e.g., "HIGH GAIN", "LOW GAIN", "SLEEP", etc.), etc.

Additionally, in some variants, each distinct series has a corresponding pointer. For example, a series of parameters associated with channel 0 has a corresponding channel 0 pointer and a series of parameters associated with channel 1 has a corresponding channel 1 pointer. Each pointer may be independently incremented and/or decremented, as required. In alternative embodiments, multiple series may share a common pointer.

During simplified signaling operation, the apparatus 200 is configured to trigger configuration of various operations according to the series of parameters, based on simplified signaling. In one exemplary embodiment, the second protocol of bus operation can coexist during normal operation (e.g., during normal I2C bus operation). For example, in one exemplary embodiment, a controller configures a series of hardware gain parameters for a photodiode receiver that are rapidly switched in succession via the I2C SDA and SCL lines.

In the exemplary embodiment, the gain pointer increment command consists of driving SDA low and then high while SCL is held high. Within the context of I2C, the gain pointer increment command is an I2C start command followed by an I2C stop command. Other controllers (e.g., legacy components, etc.) will disregard this command as it essentially embodies a transaction of zero length in the context of I2C.

Additionally, the gain pointer reset command consists of driving SCL low and then high while SDA is held high. Other controllers will view this command as an invalid I2C operation. Properly-implemented controllers will disregard this transaction since it is invalid. Those of ordinary skill (given the contents of the present disclosure) will appreciate that the controller operations are disregarded as null and/or invalid I2C transactions and thus can be safely ignored by other nodes of the I2C bus. In this manner the simplified signaling does not impede normal I2C bus transactions. It is readily appreciated that in alternative implementations, the simplified signaling may "confuse" I2C nodes, thus in some cases, the simplified signaling protocol is limited to operation while the I2C bus is disabled (and vice versa). Still other implementations may retain a portion of the first protocol while the second protocol is active; for example, in some designs the I2C bus may allow existing sleep or idle states while the second protocol is active, etc.

In one embodiment of the present disclosure, the second protocol is enabled/disabled according to a control register. Specifically, when the control register is written, bus control is transitioned over to a controller (e.g., dedicated hardware) that is configured to implement the simplified signaling protocol. In one exemplary embodiment, the controller is configured to provide channel gain parameters to a dedicated application specific integrated circuit (ASIC) to perform multiple measurements useful for monitoring a heartbeat. In some cases, the controller is configured to automatically loop-back through the series of parameters until disabled, in other cases the controller is configured to automatically disable the second protocol when all the parameters have been consumed (e.g., as opposed to looping back). Other examples of termination conditions include without limitation: timer expiration, a number of iterations, an out-of-band condition (e.g., application layer software conditions), power conditions (e.g., sleep mode), etc.

Example Operation—

Figure 3:
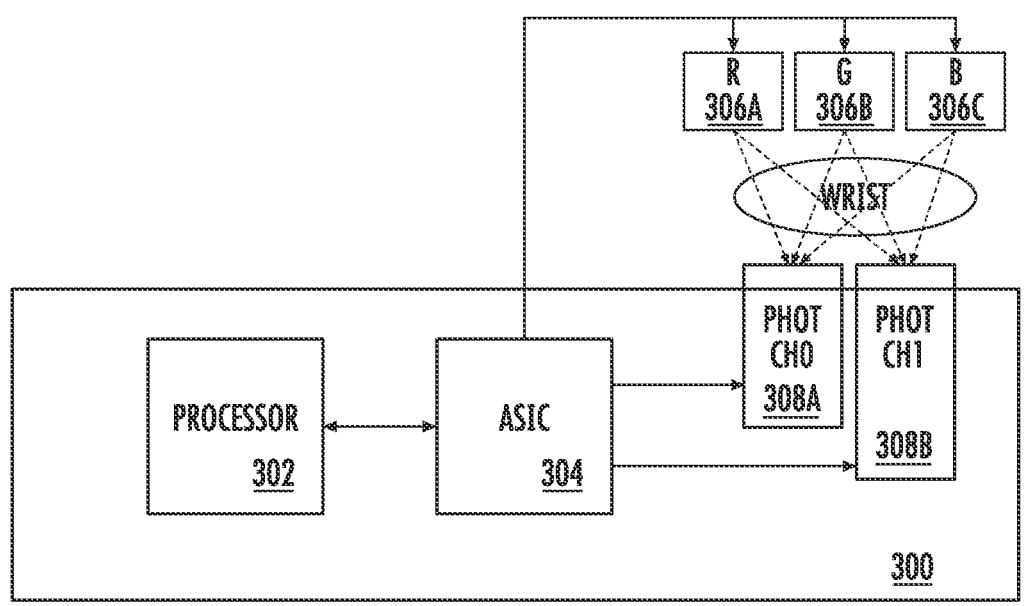
FIG. 3 is a logical block diagram of one exemplary embodiment of an I2C network, in accordance with various aspects of the present disclosure.

FIG. 3 illustrates one exemplary embodiment of an I2C network 300 configured as a heartbeat monitor/measurement system in accordance with various aspects of the present disclosure. As shown in FIG. 300, the I2C network includes a controller 302 that is configured to operate as either an I2C master or peripheral, and which is connected to an Application Specific Integrated Circuit (ASIC) 304 and three (3) light emitting diodes (LEDs) (Red 306A, Green 306B, Blue 306C). The ASIC 304 is connected to a pair of photodiodes (Channel 0 308A, Channel 1 308B). The measurement system 300 may be further controlled by an external processor (such as an applications processor (AP), etc.) as needed to obtain a set of desired measurements. Those of ordinary skill in the related arts will readily appreciate that the apparatus 300 may be generalized to any number of LEDs and/or photodiodes, configured to use virtually any wavelength of light, the foregoing being purely illustrative.

In one exemplary implementation, the network of FIG. 3 may be adapted to e.g., measure heartbeats by visually detecting a pulse through human flesh, however those of ordinary skill in the related arts will readily appreciate that the instant example is purely illustrative of the broader principles described herein.

During a measurement sequence, the controller 302 fires the LEDs 306 in sequence at different times (e.g., $t_0$, $t_1$, $t_2$, etc.); for each corresponding time, the photodiodes 308 are each configured with a corresponding receiver gain value. The light emitted by the LEDs 306 is measured by the corresponding photodiodes 308. For example, one exemplary measurement sequence is illustrated according to TABLE 1 below:

TABLE 1

| RED | GREEN | BLUE |
|---|---|---|
| [Ch0 = 1, Ch1 = 3] @ $t_0$ | [Ch0 = 2, Ch1 = 5] @ $t_1$ | [Ch0 = 8, Ch1 = 10] @ $t_2$ |
| [Ch0 = 2, Ch1 = 6] @ $t_3$ | [Ch0 = 7, Ch1 = 12] @ $t_4$ | [Ch0 = 7, Ch1 = 11] @ $t_5$ |
| ... | ... | ... |

The ASIC 304 has corresponding pointers to current registers of a number of registers (or memory) which are pre-programmed with gain values (or programmed prior to the measurement sequence) corresponding to each photodiode 308. At each time interval, the pointer advances to the next gain value. For example, the registers associated with the Channel 0 photodiode 308A and Channel 1 photodiode 308B, are produced in TABLE 2 and TABLE 3, respectively.

TABLE 2

| CHENNEL 0 GAIN |
|---|
| 1 |
| 2 |
| 8 |
| 2 |
| 7 |
| 7 |

TABLE 3

| CHANNEL 1 GAIN |
|---|
| 3 |
| 5 |
| 10 |
| 6 |
| 12 |
| 11 |

As previously noted, existing I2C bus technology would perform the measurement sequence at a rate that is insufficient to support the desired application (e.g., would inaccurately measure a human heart beat). However, by pre-programming the ASIC 304 with the appropriate gain values for the photodiodes, the controller 302 only needs to indicate when to advance the pointer. In one exemplary embodiment, the controller 302 increments the pointers by generating an edge-based or level-based signal. For instance, the controller 302 may signal the incremental advance by toggling the I2C serial data (SDA).

Figure 4:
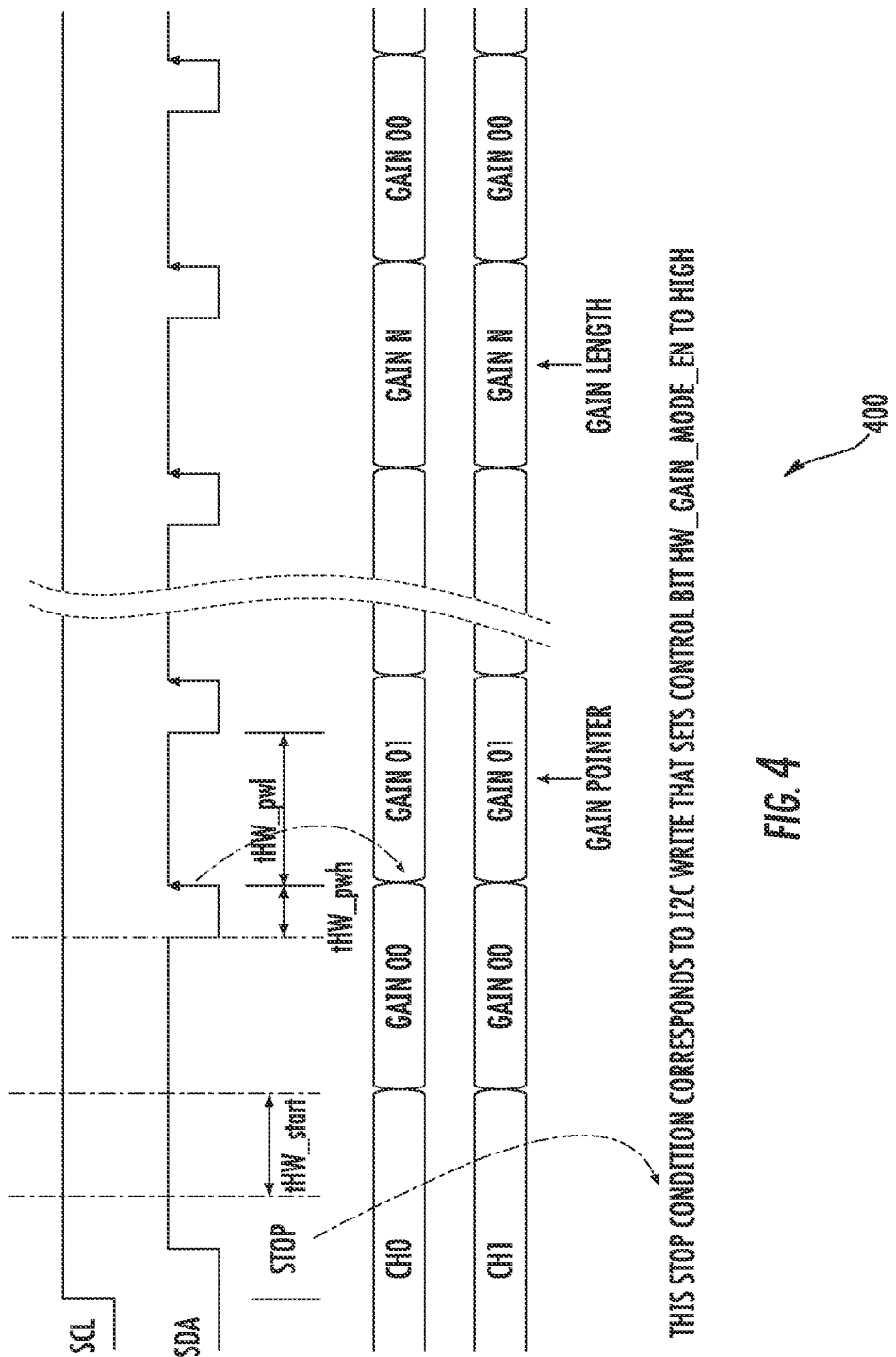
FIG. 4 is a graphical representation of one exemplary I2C bus transaction illustrative of the various principles described herein.

FIG. 4 illustrates one exemplary I2C bus transaction 400 illustrative of the foregoing process. As shown, the I2C bus operates under normal I2C bus protocols until the exemplary controller 302 initiates a Hardware (HW) Gain Switching Mode (HGSM) and transfers control of the bus to an internal peripheral that implements the required timing for HGSM. In one exemplary embodiment, the controller 302 includes two (2) internal peripherals: (i) an I2C master peripheral, and (ii) a HGSM peripheral. Both peripherals are connected to the same physical set of I2C terminals inside the controller 302. As shown, the HGSM is triggered when the control bit HW_GA_MODE_EN is set to logic high (or otherwise enabled) using an I2C write. Once the I2C write successfully completes (as shown with the STOP), then the I2C bus transitions to HGSM as signified by allowing SCL to transition to logic high first, followed by allowing SDA to transition to logic high. In the exemplary embodiment, the I2C master peripheral is not disabled and can continue to respond while the HGSM peripheral is active (i.e., the two are not mutually exclusive); the HGSM peripheral is not the master of the I2C bus, and thus another master could gain control of the I2C bus (for example, in multi-master type topologies).

Initially, the gain pointer (for both channel 0 and channel 1) are set to the gain 0 entry. A set-up time may be necessary for the photodiodes to initialize to the gain 0 value (as represented by $t_{Hw\_start}$ time) and/or for the ASIC 304 to prepare to convert input photo current from the photodiodes. Thereafter, the I2C network operates in HGSM, where the photodiodes increment through their gain values at SDA rising edges (i.e., the SDA is asserted to logic low and then logic high to indicate a rising edge). In one implementation, the pulse must remain low for a minimum pulse width ($t_{HW\_pwh}$) and satisfy spacing requirements while SCL is high ($t_{Hw\_pwt}$), so as provide glitch rejection.

In order to start HGSM, the controller 302 writes to a register that contains the HW_GAIN_MODE_EN bit, setting that bit to logic high ("1") and upon sending the STOP condition which is part of a normal I2C transaction, HGSM is enabled. Control of the lines continues to be held by the controller 302, however the HGSM peripheral (internal to the controller 302) holds SCL high and pulses SDA and holds SDA high and pulses SCL to increment and reset the gain pointer respectively. The HGSM retains control until the cycle is competed and the pointer loops back to the first gain setting.

To take the I2C bus out of HGSM, the controller 302 writes the control bit HW_GAIN_MODE_EN to logic low ("0"). Thereafter, the I2C bus transitions back to the normal operational protocol.

In some variations, the I2C network 300 may provide additional functionality. For example, in some cases, the pointers may be configured to automatically loop back to the starting values at a specified length (e.g., a parameter GAIN_LENGTH). In other cases, the pointers may be configured to automatically loop back to the starting values upon cycling through all the gain values. In still other variants, the gain values are only cycled once (i.e., subsequent toggling is ignored until the controller 302 restarts ("re-arms") the measurement sequence).

Figure 5:
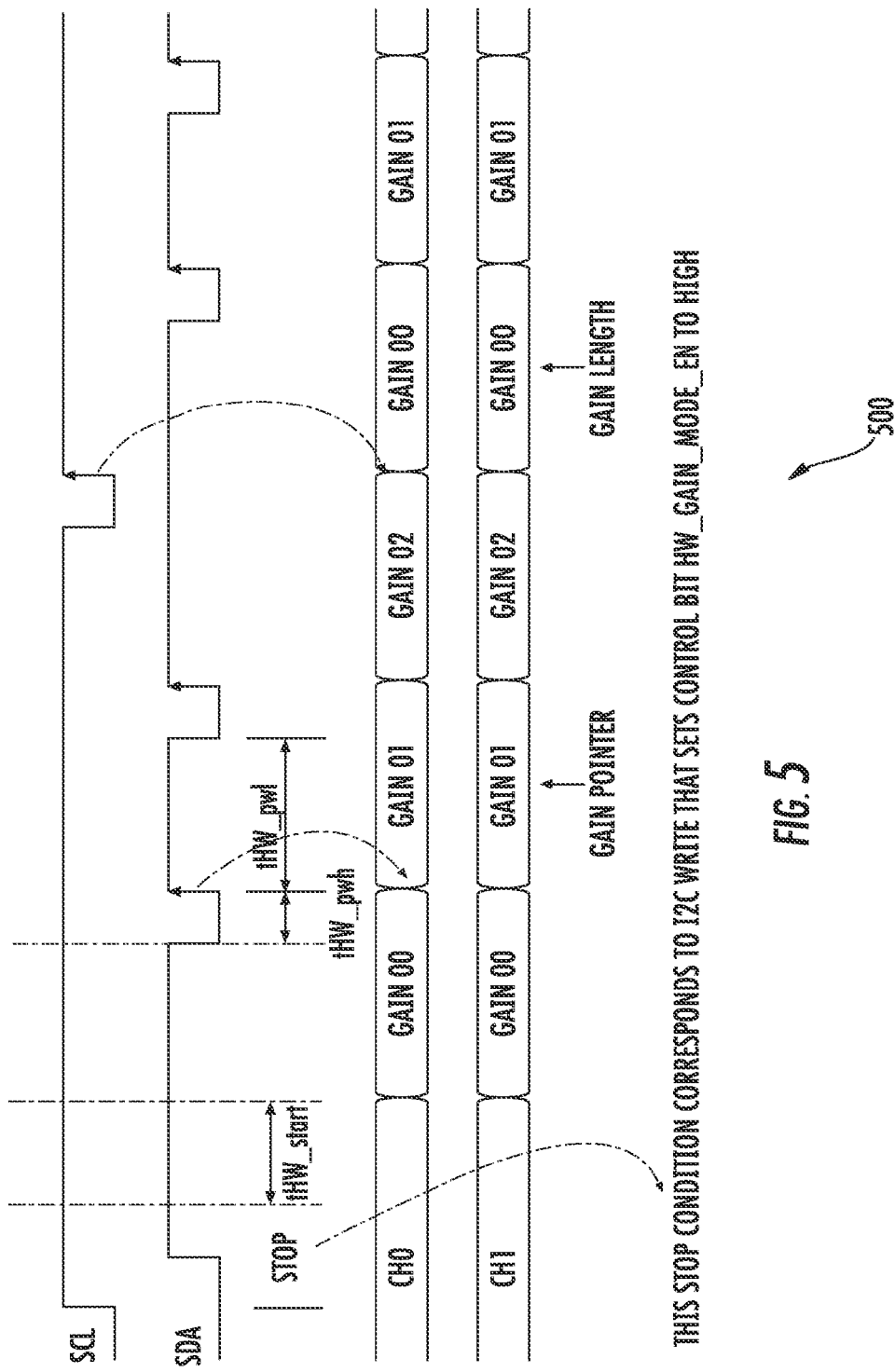
FIG. 5 is a graphical representation of an exemplary I2C bus reset transaction illustrative of the various principles described herein.

In other implementations the controller 302 may be able to reset the gain pointer to the starting value. For example, as shown in FIG. 5, the gain pointers are reset by toggling the SCL while holding SDA at logic high. While FIG. 5 shows that the measurement sequence 500 merely starts over and continues, it is appreciated that other embodiments may be able to terminate the measurement sequence early (e.g., no further measurements are performed). For example, premature termination may be useful where e.g., completing the complete measurement sequence is not required, or to reduce power consumption. In some cases, triggering a reset may additionally improve bus robustness. For example, if the I2C bus experiences a static discharge the bus may enter an unknown state. By resetting the bus, the controller 302 can minimize the impact and/or correct for unknown states.

In some simple embodiments, the pointers advance in concert. In other embodiments the pointers advance separately (e.g., one pointer may advance based on toggling SDA, the other may advance based on toggling SCL, etc.). While the foregoing example is provided in the context of both channels having the same number of gain parameters, those of ordinary skill in the related arts will readily appreciate that the channels may have different lengths and/or be for different parameters. Common examples of parameters for a photodiode include without limitation e.g., power, capacitance value, etc.

Figure 6:
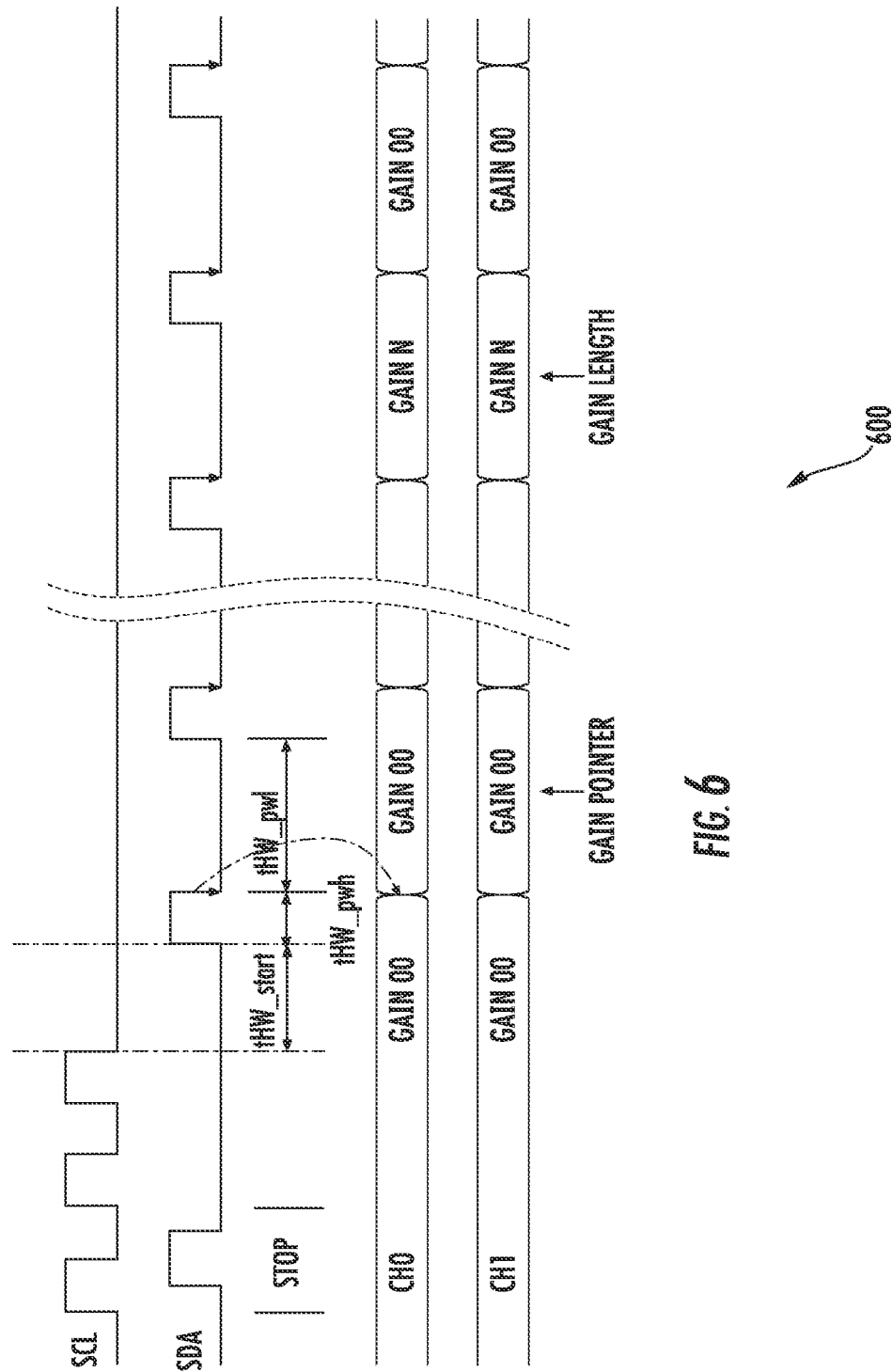
FIG. 6 is a graphical representation of one exclusionary exemplary I2C bus transaction illustrative of the various principles described herein.

Referring now to FIG. 6, another exemplary exclusionary I2C bus transaction 600 illustrative of the foregoing process is depicted. As previously alluded to with reference to FIG. 4, the HGSM peripheral operates as an I2C slave to perform parameter switching. Since the HGSM peripheral is not the master of the I2C bus, another master could gain control of the I2C bus. In contrast, as shown in FIG. 6, the HGSM peripheral has pulled SCL low, and thus no other I2C master can gain control of the I2C bus. In this manner, the HGSM peripheral excludes other I2C transactions. Since no other master can use the I2C bus, the HGSM must affirmatively relinquish control (e.g., by allowing SCL to float to logic high). While the exemplary I2C network is directed to a single-purpose ASIC capable of interpreting HGSM commands, those of ordinary skill in the related arts will readily appreciate that the various principles of the present disclosure are broadly applicable to virtually any I2C component and/or device.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for enabling rapid transactions over a speed limited bus, comprising:
   causing a component to operate according to a first signaling protocol;
   pre-loading a series of parameters into the component, the series of parameters comprising parameters selected for use in one or more operations to be performed by the component;
   enabling a second signaling protocol on the component, the second signaling protocol being different from the first signaling protocol and comprising a simplified signaling protocol having a reduced transaction overhead for the one or more operations to be performed by the component relative to that of the first signaling protocol;
   causing the component to perform the one or more operations with the series of parameters, based on the second signaling protocol, while enabling the one or more operations according to the first signaling protocol; and upon completion of the one or more operations, disabling the second signaling protocol, and causing the component to operate according to the first signaling protocol.

2. The method of claim 1, where the pre-loading of the series of parameters into the component comprises pre-loading the series of parameters into the component according to the first signaling protocol; and
where the causing of the component to operate according to the first signaling protocol comprises enabling a capability that the simplified signaling protocol does not enable.

3. The method of claim 2, where the capability is selected from the group consisting of: addressing, flow control, bus arbitration, acknowledgment/non-acknowledgement, and power control.

4. The method of claim 2, where the causing of the component to perform the one or more operations based on the simplified signaling protocol comprises causing the component to perform the one or more operations based on the simplified signaling protocol without the first signaling protocol.

5. The method of claim 2, where the causing of the component to perform the one or more operations based on the simplified signaling protocol comprises causing the component to perform the one or more operations based on the simplified signaling protocol coexistent with the first signaling protocol.

6. The method of claim 1, where the causing of the component to perform the one or more operations comprises causing the component to perform the one or more operations in a mutually-agreed-upon context characterized by a specific purpose.

7. The method of claim 6, where the causing of the component to perform the one or more operations in the mutually-agreed-upon context characterized by the specific purpose comprises performing a series of measurements based on the series of parameters.

8. The method of claim 7, further comprising incrementing through each measurement of the series of measurements.

9. The method of claim 8, further comprising resetting the series of measurements.

10. An apparatus configured to enable rapid transactions over a speed limited bus, comprising:
a plurality of photodiodes and a plurality of light emitting diodes (LEDs);
a controller coupled to an operational memory; and
an applications specific integrated circuit (ASIC) coupled to a parameter memory;
where the controller and the ASIC are connected via the speed limited bus; and
where the operational memory comprises a non-transitory computer readable medium comprising instructions which when executed by the controller are configured to cause the controller to:
pre-load a series of parameters into the parameter memory;
enable a hardware gain switching mode; and
signal one or more operations with the pre-loaded series of parameters via the speed limited bus, based on the hardware gain switching mode;
where at least one of the one or more operations is configured to:
cause each of the plurality of LEDs to emit light sequentially at different times, the different times comprising at least a first time and a second time; and
at the first time, cause the ASIC to set a gain to a first pre-programmed gain value for a first one of the plurality of photodiodes, and at the second time, use a pointer reference to set the gain to a subsequent pre-programmed gain value for a second one of the plurality of photodiodes;
where the usage of the pointer reference to set the gain occurs at regular time intervals.

11. The apparatus of claim 10, where the speed limited bus comprises an Inter-Integrated Circuit (I2C) Bus comprising a serial data (SDA) and serial clock (SCL).

12. The apparatus of claim 11, where a first signal associated with the at least one of the one or more operations comprises a toggle of the SDA while the SCL is held at a logic high.

13. The apparatus of claim 12, where the first signal is not a valid I2C transaction.

14. The apparatus of claim 11, where the hardware gain switching mode is configured to prevent another component from mastering the I2C bus.

15. An apparatus configured to enable rapid transactions over a speed limited bus, comprising:
a non-transitory computer readable medium comprising instructions which when executed by a controller are configured to cause the controller to:
operate the speed limited bus according to a first protocol; and
operate the speed limited bus according to a second protocol during the operation of the speed limited bus according to the first protocol, the second protocol comprising a bus overhead that is lower than a bus overhead associated with the first protocol;
where the operation of the speed limited bus according to the second protocol by the controller comprises a performance of a pre-selected set of operations based on a pre-loaded series of parameters.

16. The apparatus of claim 15, further comprising a second non-transitory computer readable medium configured to store the pre-loaded series of parameters.

17. The apparatus of claim 16, where the pre-loaded series of parameters are loaded during manufacture.

18. The apparatus of claim 15, where the speed limited bus comprises an Inter-Integrated Circuit (I2C) Bus comprising a serial data (SDA) and serial clock (SCL).

19. The apparatus of claim 18, where the second protocol includes at least one signal which is an invalid I2C transaction.

20. The apparatus of claim 18, where the second protocol includes at least one signal which is a null I2C transaction.

* * * * *